(12) United States Patent
Basterash et al.

(10) Patent No.: US 10,921,871 B2
(45) Date of Patent: Feb. 16, 2021

(54) BAS/HVAC CONTROL DEVICE AUTOMATIC FAILURE RECOVERY

(71) Applicant: Trane International Inc., Davidson, NC (US)

(72) Inventors: Thomas Christopher Basterash, East Bethel, MN (US); Mark Martin, Chisago City, MN (US); Udhaya Kumar Dayalan, White Bear Lake, MN (US)

(73) Assignee: Trane International Inc., Davidson, NC (US)

( * ) Notice: Subject to any disclaimer, the term of this patent is extended or adjusted under 35 U.S.C. 154(b) by 91 days.

(21) Appl. No.: 16/415,868

(22) Filed: May 17, 2019

(65) Prior Publication Data

US 2020/0363855 A1 Nov. 19, 2020

(51) Int. Cl.
| | | |
|---|---|---|
| G06F 11/14 | (2006.01) | |
| G06F 1/3203 | (2019.01) | |
| G06F 9/445 | (2018.01) | |
| G06F 9/4401 | (2018.01) | |
| G06F 8/65 | (2018.01) | |

(52) U.S. Cl.
CPC ............ *G06F 1/3203* (2013.01); *G06F 9/445* (2013.01); *G06F 9/4406* (2013.01); *G06F 8/65* (2013.01)

(58) Field of Classification Search
CPC .................................................. G06F 11/1417
See application file for complete search history.

(56) References Cited

U.S. PATENT DOCUMENTS

| | | |
|---|---|---|
| 5,708,776 A | 1/1998 | Kikinis |
| 5,974,546 A | 10/1999 | Anderson |
| 6,195,695 B1 | 2/2001 | Cheston et al. |
| 6,230,285 B1 | 5/2001 | Sadowsky et al. |
| 6,314,532 B1 | 11/2001 | Daudelin et al. |
| 6,381,694 B1 | 4/2002 | Yen |
| 6,393,585 B1 | 5/2002 | Houha et al. |
| 6,421,792 B1 | 7/2002 | Cromer et al. |
| 6,591,376 B1 | 7/2003 | VanRooven et al. |
| 6,625,754 B1 | 9/2003 | Aguilar et al. |
| 6,845,464 B2 | 1/2005 | Gold |
| 6,934,881 B2 | 8/2005 | Gold et al. |
| 7,340,638 B2 | 3/2008 | Nicholson et al. |
| 7,373,551 B2 | 5/2008 | Rothman et al. |
| 7,409,539 B2 | 8/2008 | Arnez et al. |
| 7,424,666 B2 | 9/2008 | Chandwani et al. |
| 7,571,353 B2 | 8/2009 | Largman et al. |
| 7,734,945 B1 | 6/2010 | Levidow et al. |
| 7,774,636 B2 | 8/2010 | Rao et al. |
| 7,840,796 B2 | 11/2010 | Dayan et al. |
| 7,886,190 B2 | 2/2011 | Rothman et al. |

(Continued)

*Primary Examiner* — Albert Wang
(74) *Attorney, Agent, or Firm* — The Salerno Law Firm, P.C.

(57) ABSTRACT

Architectures or techniques are presented that can facilitate automatic recovery from a component failure exhibited by a building automation system (BAS) control device and/or a heating, ventilation, and air conditioning (HVAC) control device. A failure or fault condition with a software or firmware component can be automatically repaired. A failure or fault condition with a hardware component can be identified, potentially more quickly, and hardware component replacement can be streamlined or simplified.

20 Claims, 9 Drawing Sheets

(56) References Cited

U.S. PATENT DOCUMENTS

| | | |
|---|---|---|
| 8,132,055 B2 | 3/2012 | Anderson et al. |
| 8,132,057 B2 | 3/2012 | Jann et al. |
| 8,359,495 B2 | 1/2013 | Candea et al. |
| 8,812,906 B2 | 8/2014 | Kim et al. |
| 9,251,006 B2 | 2/2016 | Packer Ali et al. |
| 9,652,329 B2 | 5/2017 | Prasad et al. |
| 2002/0042892 A1 | 4/2002 | Gold |
| 2004/0153703 A1* | 8/2004 | Vigue ............... G06F 11/0793 714/4.4 |
| 2006/0075276 A1 | 4/2006 | Kataria et al. |
| 2007/0016901 A1 | 1/2007 | Izuta et al. |
| 2007/0033387 A1 | 2/2007 | Arnez et al. |
| 2008/0276132 A1* | 11/2008 | Majewski ........... G06F 11/0757 714/55 |
| 2010/0235617 A1 | 9/2010 | Chen |
| 2012/0054540 A1 | 3/2012 | Howard et al. |
| 2013/0346797 A1 | 12/2013 | Lang et al. |
| 2014/0136826 A1 | 5/2014 | Paek |
| 2016/0234186 A1 | 8/2016 | Leblond et al. |
| 2018/0088963 A1 | 3/2018 | Arora et al. |

* cited by examiner

BAS/HVAC CONTROL DEVICE AUTOMATIC FAILURE RECOVERY

TECHNICAL FIELD

The present disclosure is directed to systems, apparatuses, and methods for automatically recovering from a failure or fault condition that might otherwise require service by a field technician.

BACKGROUND

A building automation system (BAS) control device or a heating, ventilation, and air conditioning (HVAC) control device manages the operation of HVAC devices or other environment control devices. BAS or HVAC control devices typically have various hardware components and software components that are required for proper operation. Hardware components can include one or more programmable logic controllers (PLCs) or other processor devices, memory, interface devices, etc. Software components can include an operating system (OS), file system, device trees, one or more system applications, and a system database. If any of these hardware or software components fail, the system generally needs to be serviced by field technician.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later.

According to an embodiment of the present disclosure, a control device can comprise a memory that stores computer executable components and a processor that executes computer executable components stored in the memory. The computer executable components can comprise a building automation system (BAS) component, an operating system (OS) component, and a boot loader component. The BAS component can be configured to manage an environment control device. The OS component can be configured to manage hardware of the control device and software executed by the control device. The boot loader component can, in response to a restart of the control device, perform a restart procedure. This restart procedure can comprise the following:

In response to determining that the restart occurred due to a fault condition, incrementing a restart counter representing a number of times the control device has been restarted due to the fault condition. In response to a first determination that the restart counter does not exceed a defined restart threshold, performing a normal boot procedure comprising loading the OS component from a main storage partition. Otherwise, in response to a second determination that the restart counter exceeds the defined restart threshold, performing a recovery boot procedure comprising loading the OS component from a recovery storage partition that differs from the main storage partition.

According to an embodiment of this disclosure, the computer executable components can comprise a building automation system (BAS) component and a supervisory component. The BAS component can be configured to manage an environment control device. The supervisory component can be configured to load the BAS component and to monitor the BAS component in execution. In response to a determination that the BAS component has terminated, the supervisory component can perform a restart procedure. This restart procedure can comprise the following:

In response to determining that the BAS component terminated abnormally, incrementing a restore counter representing a number of times within a defined time period the BAS component terminated abnormally. In response to a first determination that the restore counter does not exceed a defined restore threshold, performing a normal load procedure comprising loading the BAS component from a main storage partition. Otherwise, in response to a second determination that the restore counter exceeds the defined restore threshold, performing a recovery procedure comprising copying data from a recovery storage partition to the main storage partition and loading the BAS component from a main storage partition.

In some embodiments, elements described in connection with the systems above can be embodied in different forms such as a computer-implemented method, a computer-readable medium, or another form.

DETAILED DESCRIPTION

Overview

Figure 1:
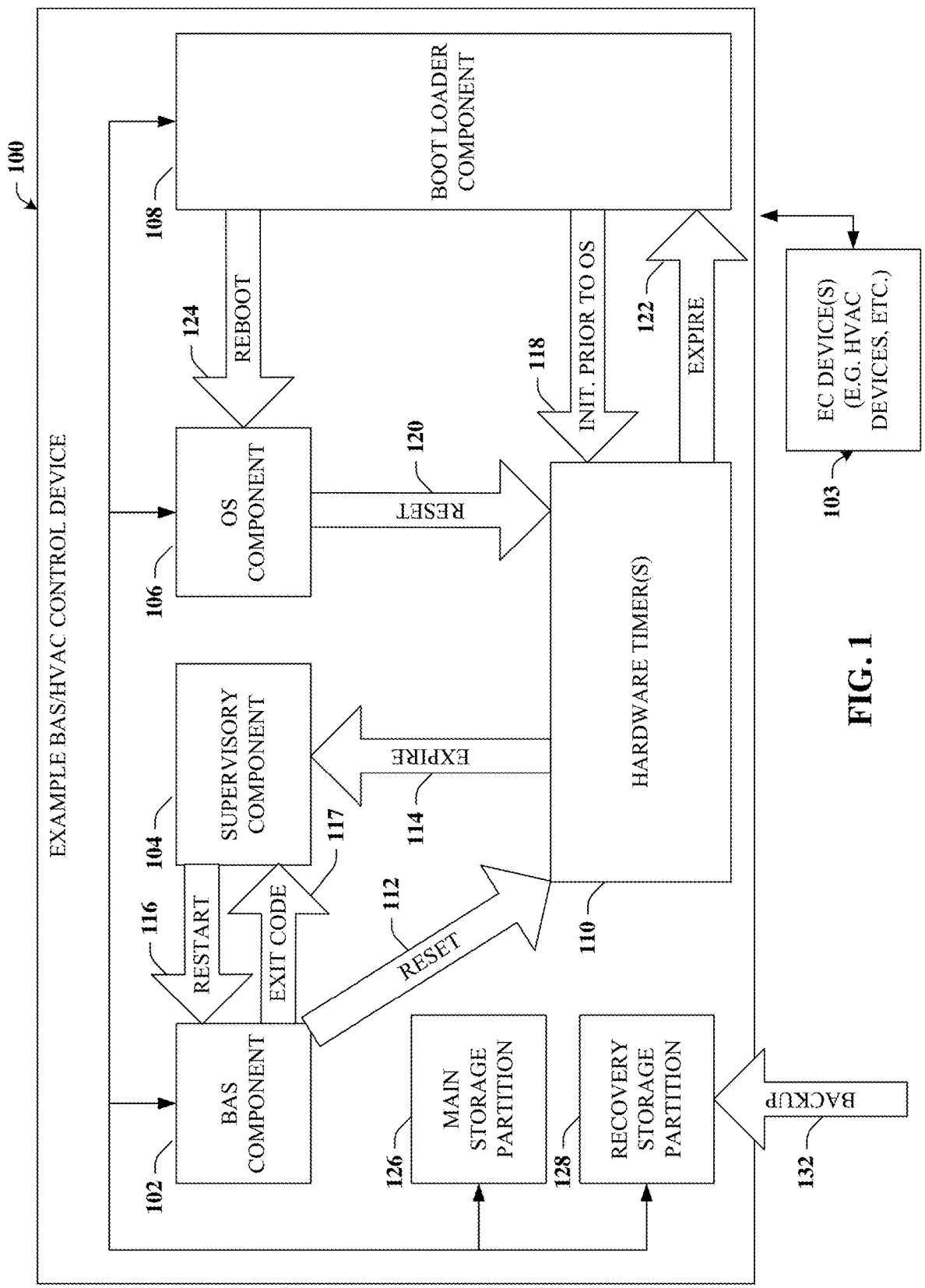
FIG. 1 illustrates a block diagram of an example non-limiting building automation system (BAS)/heating, ventilation, and air conditioning (HVAC) control device in accordance with one or more embodiments of the disclosed subject matter.

As noted in the background section, in conventional systems, a failure or fault condition of either one of a software component or a hardware component can lead to a service call to a field technician to diagnose and repair the fault condition. In the case of a hardware component failure, the manual troubleshooting, repair and recovery work the field technician performs can be automated to a significant degree. In the case of a software component failure, repair or recovery can be automated, potentially without the need of any manual intervention by a field technician.

In accordance with the disclosed techniques, relevant software components can be automatically backed up. The backups can be performed on a periodic basis (e.g., weekly, monthly, etc.) or be event driven (e.g., in response to successful/verified operation). Backup data can be stored to an onboard redundant storage location, or to an off-board location such as a remote database on the Internet. When a controller detects a failure of one of these components, a number of scenarios may occur. If the failed component is not mission critical (such as an ancillary database component), the system may attempt to automatically revert the database. Or, the controller may choose to restart the application that is utilizing that particular database component. If these procedures fail to restore proper controller operation, the controller can automatically restore the bad component from the backup location. The controller can then restart the affected application and continue with normal operation, without any operator intervention needed.

If the controller experienced a software component failure in an area that is mission critical (e.g., the operating system), the system will usually "crash" and attempt to restart. If the attempted restart fails, the system can enter a recovery mode by booting from a protected software area. The recovery mode might be able to automatically restore the bad component, up to and including reformatting and replacing the entire main operating system, file system, database, etc. from the backup location. Once the automatic restoration process is complete, the system can be automatically rebooted and brought back into service using the normal operating configuration, without any operator intervention needed.

In each of these scenarios, a diagnostic audit can be generated alerting the user or other interested parties to what happened and what steps were taken to restore normal system operation.

As an additional option, if the controller experienced a failure that is determined so catastrophic as to force hardware replacement, the new controller hardware can be installed and then returned to proper operation by restoring the operating system, database, applications, etc. from the backup storage location (e.g., the same configuration that the failed controller was using). In that case, the restoration procedure might require manual intervention from a technician, but such can be simplified in that the technician need only physically replace the failed controller and provide some identification information. From there, the controller can automatically restore itself (e.g., using previously acquired configuration and operational data) and resume normal operation.

Example Systems

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

Referring now to the drawings, with initial reference to FIG. 1, a block diagram of an example non-limiting building automation system (BAS)/heating, ventilation, and air conditioning (HVAC) control device 100 is depicted in accordance with one or more embodiments of the disclosed subject matter. In some embodiments, control device 100 can automatically recover from component (e.g., a software/firmware component) failure. In some embodiments, control device 100 can simplify or streamline manual procedures such as troubleshooting, diagnostic, auditing, replacement, repair, etc. of failed components.

It should be understood that in the discussion of the present embodiment and of embodiments to follow, repetitive description of like elements employed in the various embodiments described herein is omitted for sake of brevity. Control device 100 can comprise a processor and a memory that stores executable instructions that, when executed by the processor, facilitate performance of operations. Examples of said processor and memory, as well as other suitable computer or computing-based elements, can be found with reference to FIG. 9, and can be used in connection with implementing one or more of the devices or components shown and described in connection with FIG. 1 or other figures disclosed herein Control device 100 can comprise BAS component 102. BAS component 102 can be a software component and can be configured to manage an environment control (EC) device 103. EC devices 103 can be hardware devices with or without associated software components or firmware components. Examples of EC device 103 can include HVAC devices, lighting devices, or another suitable device that monitors or controls an environment. Control device 100 can further include supervisory component 104. Supervisory component 104 can be a software component and can be configured to load BAS component 102 and to monitor BAS component 102 in execution, which is further detailed below. As will be discussed, supervisory component 104 can communicate information to BAS component 102 or receive information from BAS component 102. Examples can include restart 116 or exit code 117.

In addition, control device 100 can comprise operating system (OS) component 106. OS component 106 can be a software component and can be configured to manage various hardware and software of control device 100. In some embodiments, OS component 106, upon starting, can load supervisory component 104, which can, in turn, load BAS component 102. Control device 100 can further include boot loader component 108. Boot loader component can execute a boot sequence for control device 100, which can include loading OS component 106.

In operation, control device 100 can manage and control EC devices 103 in a manner desired by a user or customer. As noted, due to any of a wide variety of potential fault conditions, control device 100 or a component thereof may "crash," "panic," or freeze, or otherwise become unresponsive, terminate execution, or the like. One way to detect a fault condition is via one or more hardware timers 110 that can track time in a suitable manner. Typically, hardware timer 110 can be set to count up to or down from a set time (e.g., five minutes). Unless the count (or an appropriate offset) is reset, upon expiration, a signal can be generated. For example, during normal execution, BAS component 102 can periodically (e.g., every few minutes) instruct hardware timer 110 to reset via reset instruction 112. Thus, if BAS component 102 crashes, freezes, or otherwise stops issuing reset instruction 112, hardware timer 110 can issue expiration message 114 to supervisory component 104. In response, supervisory component 104 can restart 116 BAS component 102.

The above-described technique can be useful in connection with fault conditions of BAS component 102. In conventional systems, a hardware (e.g., watchdog) timer is typically initialized by a BAS control application. However, because this BAS control application is not started until after the OS is loaded, conventional systems can potentially detect when the BAS control application becomes unresponsive, but generally cannot detect in the same manner an issue with the OS itself. For example, if the OS fails to load, the BAS control application will not be started to initialize a watchdog timer, which can lead to a service call.

The inventors have observed that use of hardware timer 110 can be extended to detect, e.g., OS component 106 fault conditions as well, which can be automatically remedied in an appropriate manner, potentially avoiding the aforementioned service call. For example, as illustrated by reference numeral 118, boot loader component 108 can initialize one or more hardware timers 110 prior to loading OS component 106. Likewise, OS component 106 can be extended with functionality to periodically issue reset instruction 120 to reset the count or offset of hardware timer 110. Hence, if OS component fails to load, freezes or crashes, or otherwise fails to issue reset instruction 120, expiration message 122 can be provided to boot loader component 108. In response, boot loader component 108 can reboot 124 OS component 106. In some cases, for example if previous reboot attempts have been performed, boot loader component 108 can take other actions such as, for example, performing a recovery procedure further detailed in connection with FIG. 2.

Given the above architectures and techniques, numerous opportunities arise to recover from component failures that did not exist or were not recognized by previous systems. For example, it is appreciated that in some cases, a reboot 124 of OS component 106 or a restart 116 of BAS component 102 will not be sufficient to remedy a given fault condition. For instance, suppose BAS component 102 or OS component 106 has become corrupted and/or a file system of control device 100 has been corrupted.

In operation, software components of control device 100 (e.g., OS component 106, supervisory component 104, BAS component 102, etc.) are typically loaded from some storage memory of control device 100. In this example, such is referred to as main storage partition 126. Supposing a file system corruption, it is unlikely that a reboot 124 or a restart 116 will remedy the issue. In accordance with techniques disclosed herein, a recovery storage partition 128 can be employed. Recovery storage partition 128 can be remote from control device 100 (e.g., in a cloud or external drive), plugged in to control device 100 (e.g., a secure digital (SD) card or the like), or on-board, as depicted here.

Recovery storage partition 128 can include all or a portion of an image of OS component 106, supervisory component 104, BAS component 102, a kernel of OS component 106, a device tree, a file system, a database used by BAS component 102 or other components, and so forth. In effect, any suitable data that can be useful in recovering from a potential fault condition to control device 100 can be stored to recovery storage partition 128. As illustrated at reference numeral 132, such data can be backed up periodically. For example, BAS component 102, OS component 106, or another suitable component can periodically backup configuration settings and other databases, software, firmware, or other updates, or boot or load images.

Figure 2:
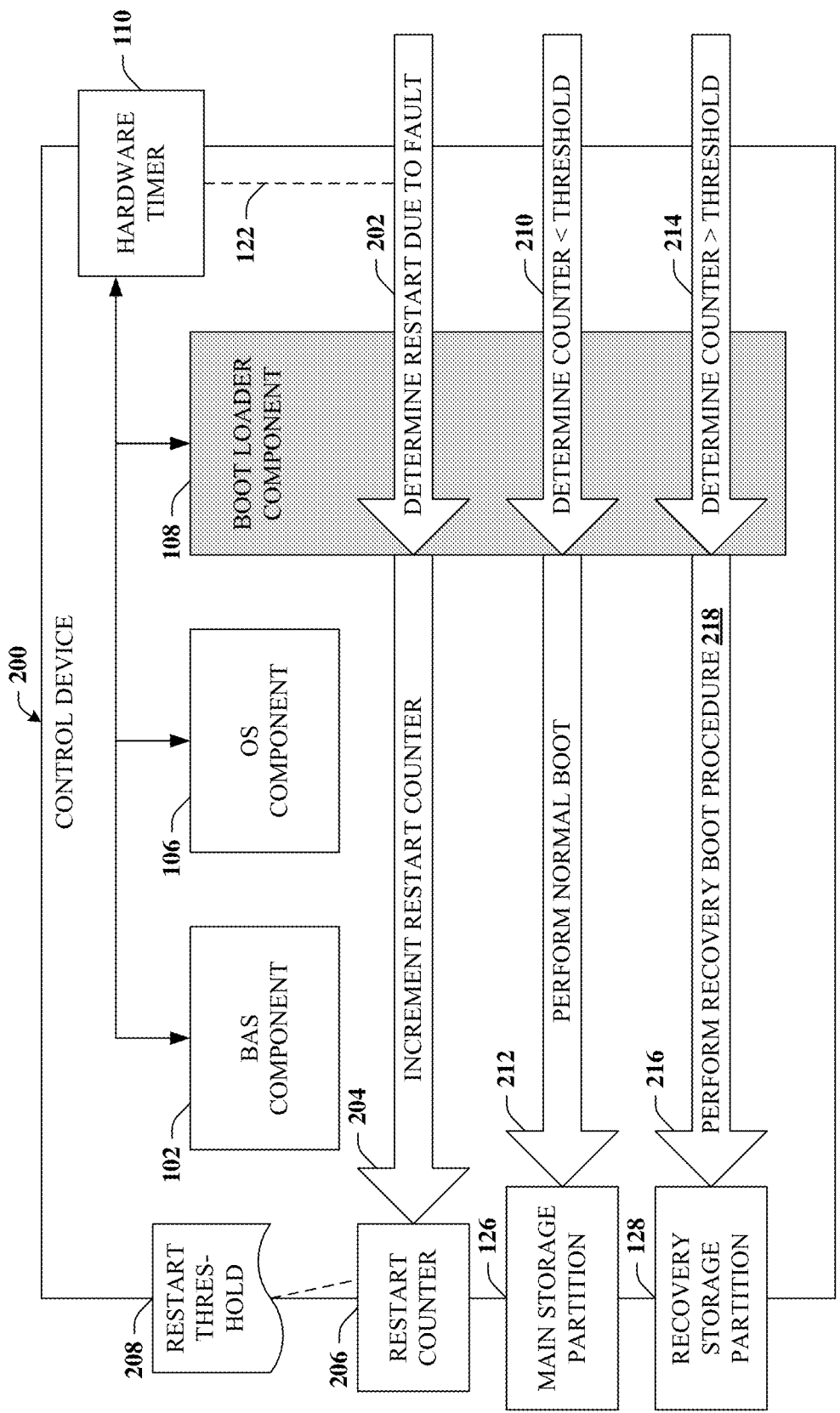
FIG. 2 illustrates a block diagram of an example control device that can facilitate automatic recovery from component failure in response to a device restart or reboot in accordance with one or more embodiments of the disclosed subject matter.

Turning now to FIG. 2, a block diagram of an example control device 200 is depicted. Control device 200 can facilitate automatic recovery from component failure in response to a device restart or reboot in accordance with one or more embodiments of the disclosed subject matter. Control device 200 can include BAS component 102, OS component 106, and boot loader component 108 as substantially described in connection with FIG. 1. In some embodiments, control device 200 can include other elements or components of FIG. 1 or other figures detailed herein.

For example, control device 200 can include hardware timer 110, main storage partition 126, recovery storage partition 128, and others. It is noted that elements presented to overlap the boundaries of control device 200 can be on-board or otherwise included in control device 200 in some embodiments or situated remotely from control device 200 in other embodiments. For example, although not required, it can be beneficial for main storage partition 126 to be located on-board of control device 200. However, certain other benefits might arise when recovery storage partition 128, or a portion thereof, is remote such as at a cloud server device.

As noted previously, boot loader component 108 can be responsible for booting or restarting control device, e.g., by executing a boot sequence when control device 200 is restarted or powered on. Hence, in response to a restart of control device 200, boot loader component 108 can perform a restart procedure, which can now be described in more detail.

As illustrated by determination 202, boot loader component 108 or some other suitable component can determine that a restart of control device 200 occurred due to a fault condition. In some embodiments, determination 202, that the restart occurred due to a fault condition, can be made in response to a signal (e.g., expiration message 122) from hardware timer 110. As used herein, a fault condition is intended to represent a failure of a component (in this case OS component 106) to load or a crash or freeze of the component during operation. Generally, the fault condition is intended to exclude a manual restart or restarting control device 200 or another component in response to a component upgrade or loss of power. By distinguishing between the types of restarts (e.g., those due to a fault condition vs. non-fault restarts), the disclosed techniques can operate more effectively.

When boot loader component 108 detects a restart due to a fault condition (e.g., by expiration message 122 or otherwise), boot loader component 108 can increment 204 restart counter 206. Hence, restart counter 206 can represent a number of times control device 200 has been restarted due to the fault condition. Thus, it is appreciated that restart counter 206 is not typically incremented in conjunction with restarts that were not determined to be due to a fault condition. In some embodiments, restart counter 206 can represent the number of times within a defined period of time that control device 200 has been restarted due to a fault condition. Hence, restart counter 206 can include a temporal element such that restart counter 206 can be decremented over time as the restarts being counted begin to exceed the defined period of time. This defined period of time can be configured based on implementation.

Next, boot loader component 108 can then compare a value of restart counter 206 to a defined restart threshold 208. Restart threshold 208 can represent a configurable value that can be set based on implementation. Depending on whether restart counter 206 does or does not meet or exceed restart threshold 208, different boot procedures of OS component 106 can be performed.

For example, as illustrated by determination 210, if boot loader component 108 determines that restart counter 206 does not exceed restart threshold 208 then a normal boot procedure can be performed, as depicted by reference numeral 212. Normal boot procedure can comprise loading OS component 106 from main storage partition 126. On the other hand, as illustrated by determination 214, if boot loader component 108 determines that restart counter 206 does exceed restart threshold 208 then recovery boot procedure 218 can be performed, as depicted by reference numeral 216. Recovery boot procedure 218 can involve retrieving data from recovery storage partition 128 aimed at mitigating the fault condition.

It is observed that if the fault condition persists after the normal boot procedure, subsequent restarts will likely occur. However, these restarts will continue to add to the value of restart counter 206, which will eventually exceed restart threshold 208, triggering recovery boot procedure 218, which is further detailed in connection with FIG. 4A.

Figure 3:
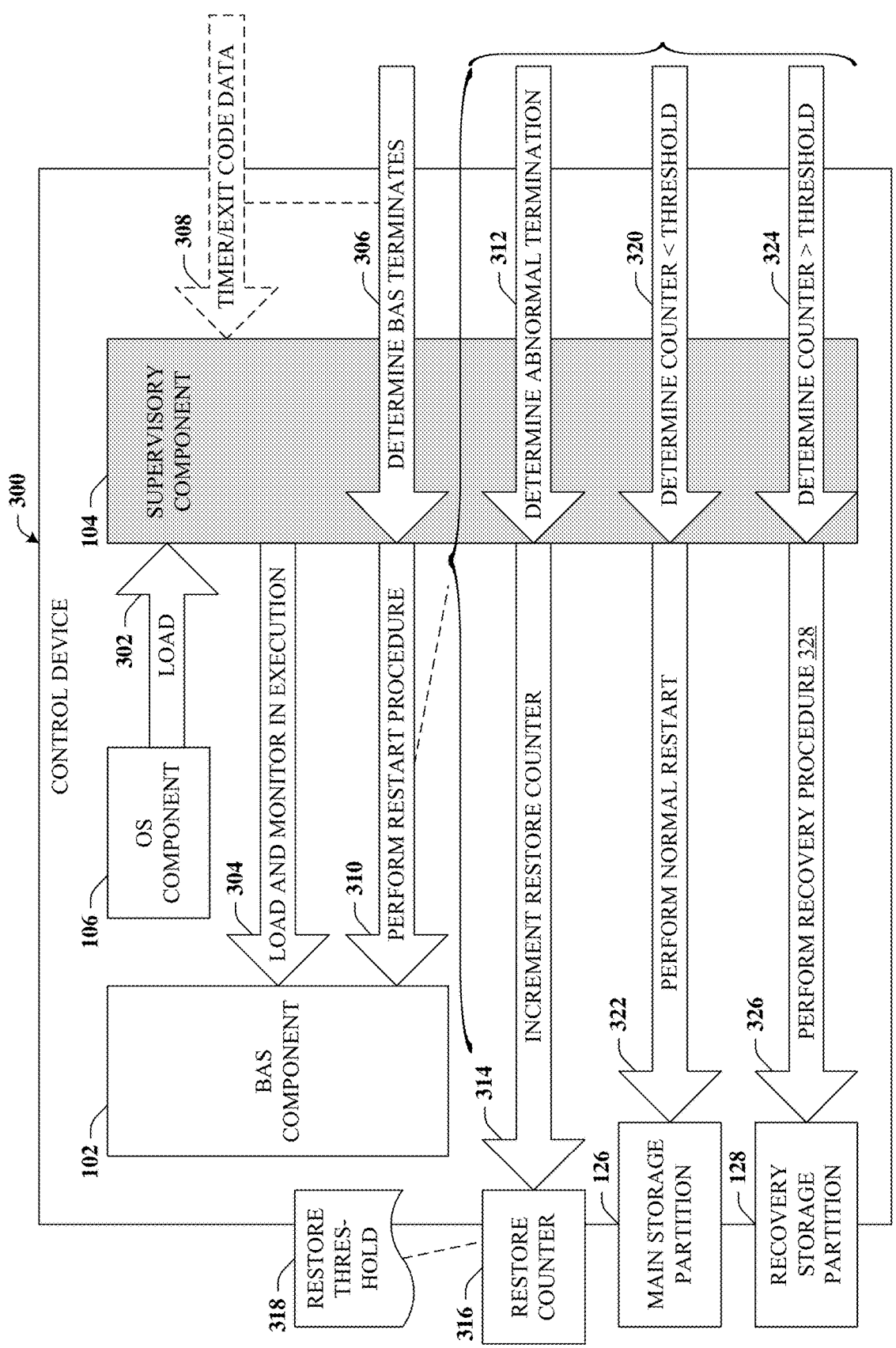
FIG. 3 illustrates a block diagram of an example control device that can facilitate automatic recovery from an abnormal termination of component execution in accordance with one or more embodiments of the disclosed subject matter.

With reference now to FIG. 3, a block diagram of an example control device 300 is depicted. Control device 300 can facilitate automatic recovery from an abnormal termination of component execution in accordance with one or more embodiments of the disclosed subject matter. Control device 300 can include BAS component 102, OS component 106, and supervisory component 104 as substantially described in connection with FIG. 1. In some embodiments, control device 300 can include other elements or components of FIG. 1 or other figures detailed herein.

In some embodiments, OS component 106 can load 302 supervisory component 104, which can load BAS component 102 and monitor BAS component 102 during execution, as illustrated at reference numeral 304. By continuously monitoring BAS component 102, supervisory component 104 can perform determination 306. Determination 306 represents a determination that BAS component 102 has terminated execution or otherwise is unresponsive or subject to a fault condition. Determination 306 can be based on, for example, data 308. Data 308 can be a signal (e.g., expiration message 114) from hardware timer 110 indicating BAS component 102 is no longer resetting the timer, or data 308 can be exit code data (e.g., exit code 117) that is generated in response to BAS component 102 terminating or exiting. Exit code data can include information about a cause of the termination of BAS component 102. In response to determination 306, supervisory component 104 can perform a restart procedure, which is depicted by reference numeral 310.

Initially, this restart procedure can include determinations about whether the restart was a normal or expected termination or abnormal (e.g., due to a fault condition). In the event of a normal termination (e.g., not due to a fault condition), supervisory component 104 can perform a normal restart of BAS component 102 from main storage partition 126 (see reference numeral 322). On the other hand, as depicted by determination 312, supervisory component 104 can determine BAS component 102 terminated execution abnormally. In addition to being used to determine that BAS component has terminated execution, data 308 can be employed to determine the nature of the termination. In the case of abnormal termination (e.g., determination 312), supervisory component 104 can increment restore counter 316. Restore counter 316 can be similar to restart counter 206 detailed in connection with control device 200 of FIG. 2. For example, restore counter 316 can represent a number of times within a defined time period the BAS component terminated abnormally.

Supervisory component 104 can then compare a value of restore counter 316 to a defined restore threshold 318. Like restart threshold 208, restore threshold 316 can represent a configurable value that can be set based on implementation. Depending on whether restore counter 316 does or does not meet or exceed restore threshold 318, different restart procedures of BAS component 102 can be performed.

For example, as illustrated by determination 320, if supervisory component 104 determines that restore counter 316 does not exceed restore threshold 318 then a normal restart procedure can be performed, as depicted by reference numeral 322. This normal restart procedure can comprise restarting BAS component 102 (or a component thereof) from main storage partition 126. It can thus be observed that normal restart procedure can occur in the case of a determination that BAS component 102 terminated normally or in the case that BAS component 102 terminated abnormally but restore counter 316 does not exceed restore threshold 318.

Otherwise, as illustrated by determination 324, if supervisory component 104 determines that restore counter 316 does exceed restore threshold 318 then recovery procedure 328 can be performed, as depicted by reference numeral 326. Recovery procedure 328 can involve retrieving data from recovery storage partition 128 aimed at mitigating the fault condition causing abnormal termination of BAS component 102. Additional detail relating to recovery procedure 328 can be found at FIG. 4B.

Figure 4A:
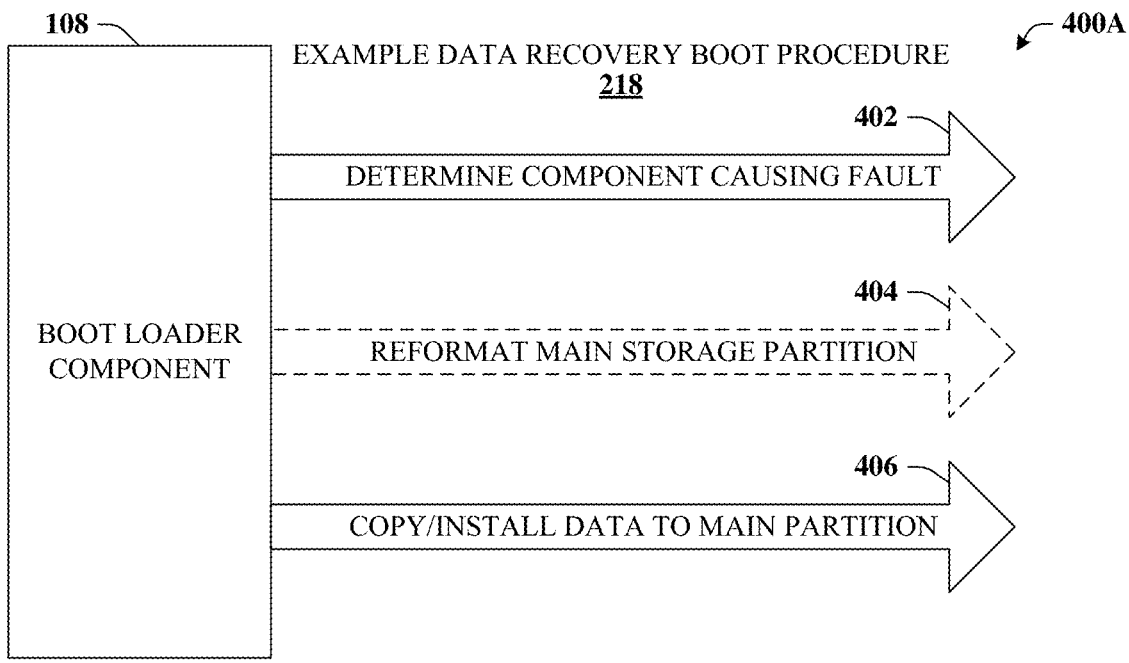
FIG. 4A illustrates a block diagram of an example recovery boot procedure in accordance with one or more embodiments of the disclosed subject matter.

Turning now to FIG. 4A, a block diagram of system 400A is depicted. System 400A illustrates an example of recovery boot procedure 218 in accordance with one or more embodiments of the disclosed subject matter. For example, boot loader component 108 can perform determination 402 that can be aimed at identifying the particular component causing the fault condition. Depending on the severity of the fault condition, boot loader component 108 can, optionally reformat main storage partition 126, as illustrated by reference numeral 404. For instance, if the fault condition relates to a corrupt file system, a reformat might be determined appropriate. On the other hand, if the fault condition relates to, e.g., a corrupt device driver, boot loader component might determine there is no need to reformat. At reference numeral 406, boot loader component 108 can retrieve the appropriate data from recovery storage partition 128 and copy or install that data to main storage partition 126. Thereafter, boot loader component 108 can boot OS component 106 from main storage partition 126, now with the recovered information.

Figure 4B:
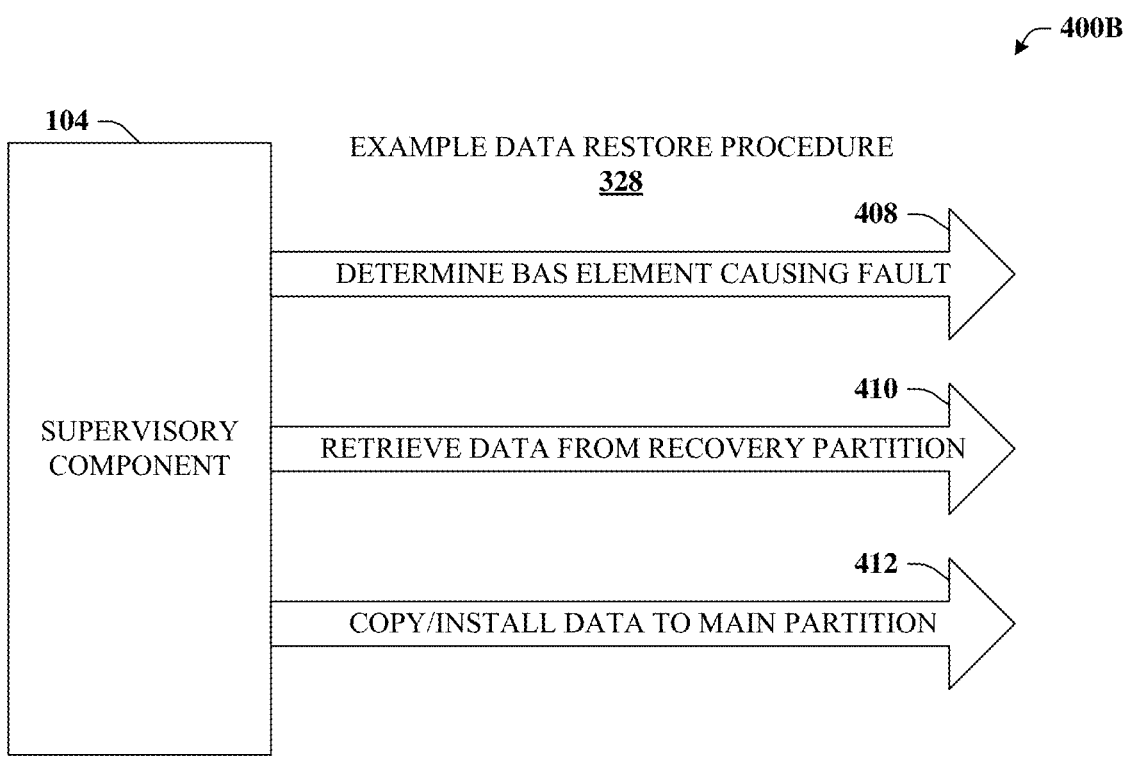
FIG. 4B depicts a block diagram of an example of recovery procedure in accordance with one or more embodiments of the disclosed subject matter.

Referring now to FIG. 4B, a block diagram of system 400B is depicted. System 400B illustrates an example of recovery procedure 328 in accordance with one or more embodiments of the disclosed subject matter. For example, supervisory component 104 can perform determination 408. Determination 408 can be aimed at identifying the particular BAS element causing the fault condition, which can relate to a corrupt database used by BAS component 102 or an issue with BAS component 102 itself. At reference numeral 410, supervisory component 104 can retrieve the appropriate data from recovery storage partition 128. At reference numeral 412, supervisory component 104 can copy or install that data to main storage partition 126. Thereafter, supervisory component 102 can restart BAS component 102 from main storage partition 126, now with the recovered information.

It is observed that because the disclosed techniques can identify and recover from faults at the application level and the OS level, virtually any software-based fault condition can be remedied without intervention of a service technician. Thus, service technician calls can be significantly reduced, typically needed only in the case of a hardware failure. Further, in the case of a hardware failure, the task of the service technician can be simplified by the disclosed techniques, as further discussed in connection with FIG. 5.

Figure 5:
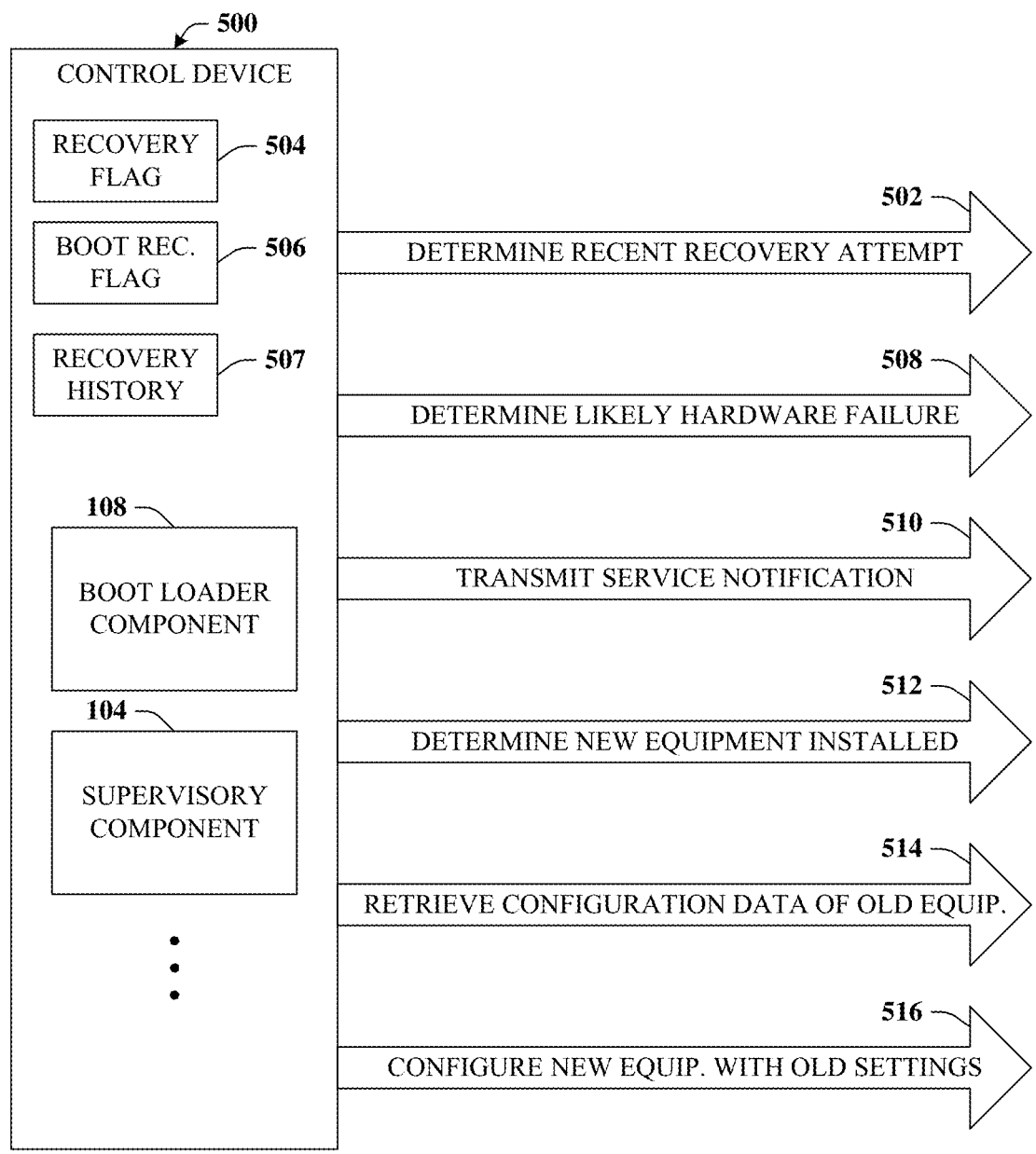
FIG. 5 illustrates a block diagram of an example control device illustrating additional aspects of elements in connection with automatic failure recovery in accordance with one or more embodiments of the disclosed subject matter.

Turning now to FIG. 5, a block diagram of control device 500 is depicted. Control device 500 illustrates additional aspects of elements in connection with automatic failure recovery in accordance with one or more embodiments of the disclosed subject matter. System 500 can include all or a portion of systems 100, 400 of FIGS. 1 and 4 or other suitable components or elements. Control device 500 can include OS component 106 and boot loader component 108 as substantially described in connection with FIG. 1. In some embodiments, control device 500 can include other elements or components of FIG. 1 or other figures detailed herein.

In some embodiments, control device 500 can perform determination 502. Determination 502 can represent a determination that a recovery procedure 328 or recovery boot procedure 218 has been recently performed. For example, as part of recovery procedure 328, supervisory component 106 can update recovery flag 504 that indicates recovery procedure 328 was performed within a defined time period. If another fault occurs that invokes the recovery procedure 328 and recovery flag 504 is set, such can indicate that the previously attempted solution was not successful. Likewise, in the case of recovery boot procedure 218, boot recovery flag 506 can be set. Thus, if another fault occurs that invokes the recovery boot procedure 218 and recovery boot flag 506 is still set, such can indicate that the previously attempted solution was not successful.

Additionally, or alternatively, recovery history 507 can be examined. Recovery history 507 can include a detailed report of the actions taken for the previous recovery attempt. If the fault condition persists, a different solution can be attempted. For example, if during a previous recovery attempt boot loader component 108 did not reformat main storage partition 126, such can be attempted in a subsequent recovery procedure.

Whether based on flags 504 and 506 that infer that a previous recovery attempt was made or based on recovery history 507 that indicate all potential recovery solutions have been exhausted, control device can determine (e.g., determination 508) that the fault condition is related to a likely or imminent hardware failure and/or software recovery attempts have not been successful. In response to determination 508, control device can transmit 510 a service notification to an appropriate target such as a device of an equipment manufacturer, a device of a service entity, or the like. This notification can include information relating to the current or imminent hardware failure, a previous or current state of the control device, the environment control device, a service request for the control device or the environment control device, and so forth.

Control device 500 can further make determination 512 that new equipment or hardware has been installed. Such can be in response to the aforementioned service notification or otherwise. Control device 500 can then retrieve configuration data of the old/faulty equipment that was replaced, at reference numeral 514 and, at reference numeral 516, configure the new equipment with the previous settings, which can significantly reduce the commissioning time of the new/replacement device.

Figure 6A:
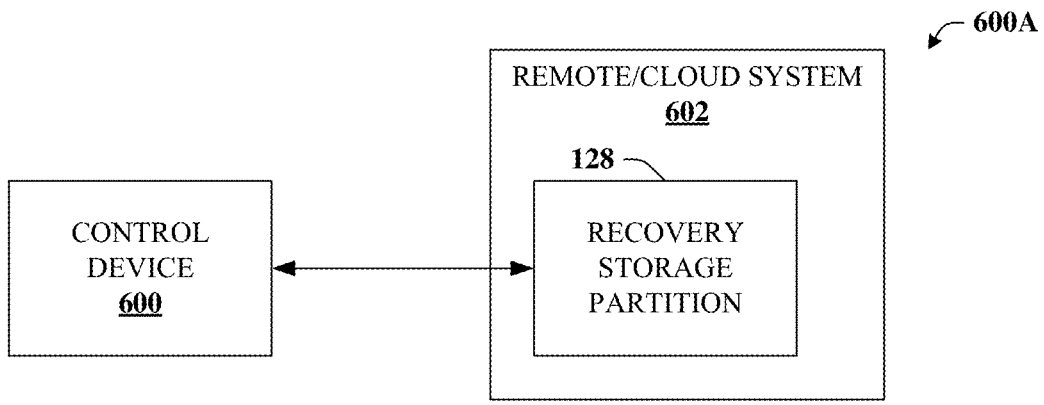
FIGS. 6A-C illustrate block diagrams of example architectural implementations that can be employed in accordance with one or more embodiments of the disclosed subject matter.
Figure 6B:
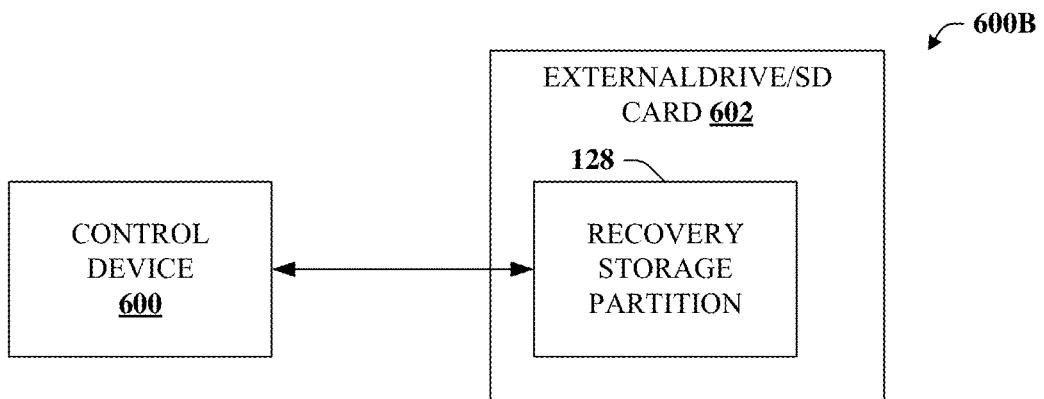
Figure 6C:
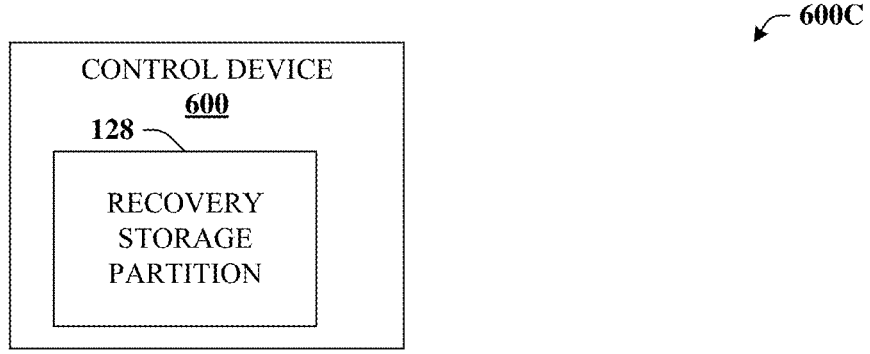

Turning now to FIGS. 6A-C, various block diagrams 600A-C of example architectural implementations are illustrated in accordance with one or more embodiments of the disclosed subject matter.

For example, block diagram 600A depicts an example architectural design in which recovery storage partition 128 is remotely located in a remote or cloud system 602. This implementation can reduce the storage demands of control device 600.

Block diagram 600B depicts an example architectural design in which recovery storage partition 128 is located in an external drive or an SD card that can be in communication with control device 600.

Block diagram 600C depicts an example architectural design in which recovery storage partition 128 is located at control device 600.

Example Methods

Figure 7:
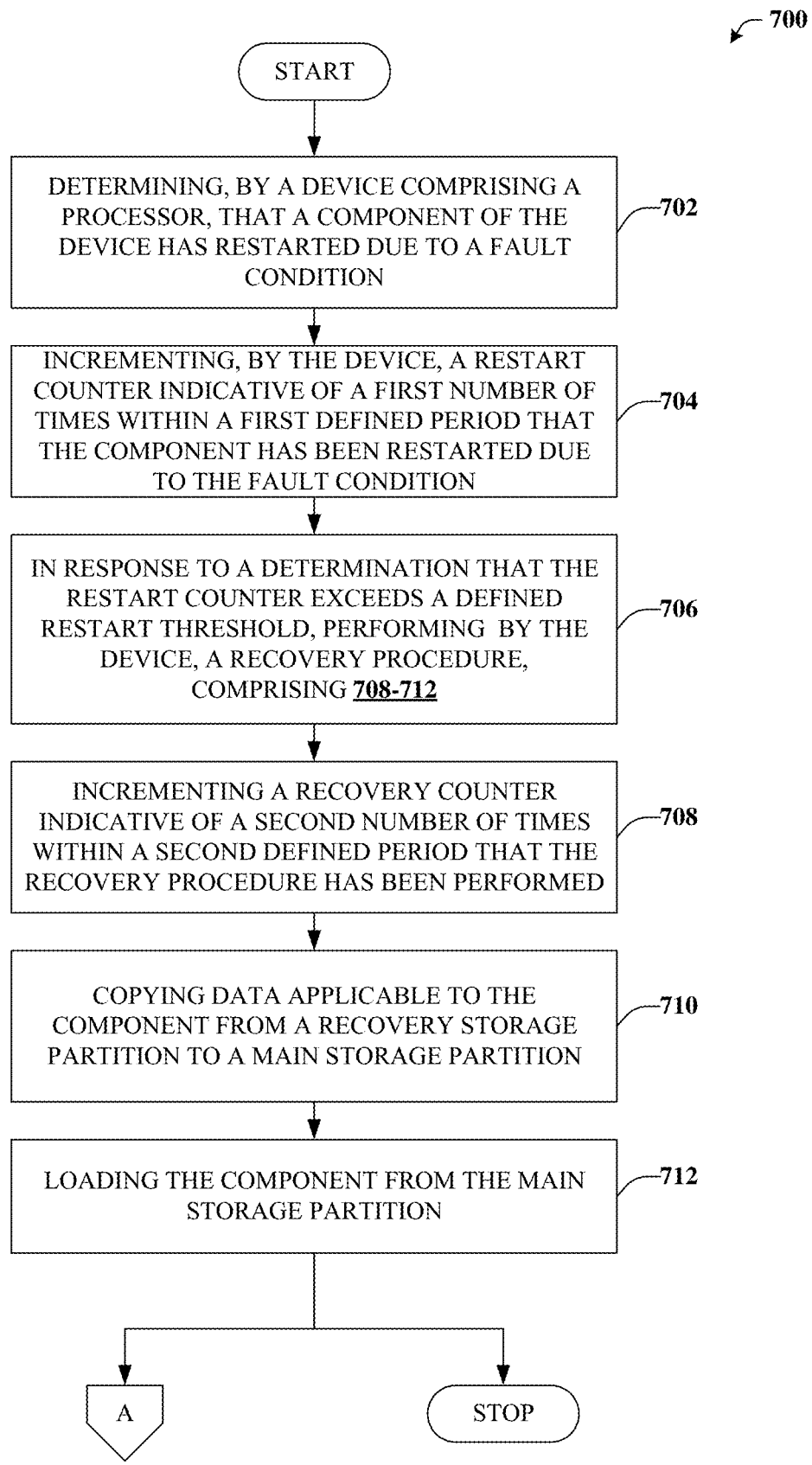
FIG. 7 illustrates a flow diagram of an example, non-limiting computer-implemented method that can facilitate automatic recovery from component failure in response to a component restart in accordance with one or more embodiments of the disclosed subject matter.
Figure 8:
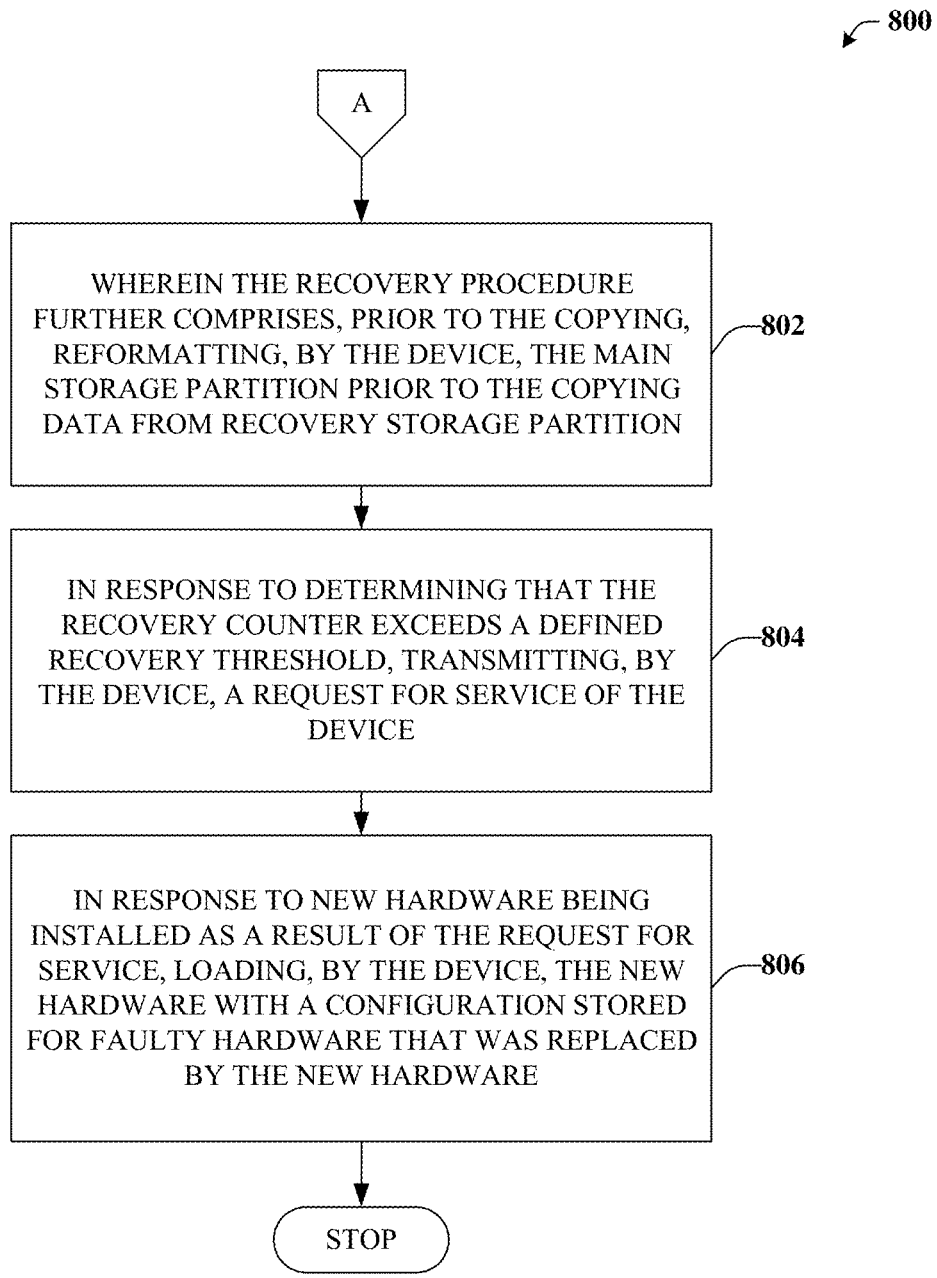
FIG. 8 illustrates a flow diagram of an example, non-limiting computer-implemented method that can provide for additional aspects or elements in connection with automatically recovery from component failure in response to a component restart in accordance with one or more embodiments of the disclosed subject matter.

FIGS. 7 and 8 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts can occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers.

FIG. 7 illustrates a flow diagram 700 of an example, non-limiting computer-implemented method that can facilitate automatic recovery from component failure in response to a component restart in accordance with one or more embodiments of the disclosed subject matter. For example, at reference numeral 702, a device (e.g., control device 100) comprising a processor can determine that a component of the device has restarted due to a fault condition.

At reference numeral 704, the device can increment a restart counter indicative of a first number of times within a first defined period that the component has been restarted due to the fault condition.

At reference numeral 706, in response to a determination that the restart counter exceeds a defined restart threshold, the device can perform a recovery procedure. This recovery procedure can comprise all or a portion of the elements detailed in connection with reference numerals 708-712.

At reference numeral 708, the device can increment a recovery counter indicative of a second number of times within a second defined period that the recovery procedure has been performed. In other words, the restart counter can be indicative of count of restarts, which if meeting the threshold can trigger the recovery procedure, while the recovery counter can be indicative of a count of the times the recovery procedure has been performed.

At reference numeral 710, the device can copy data applicable to the component from a recovery storage partition to a main storage partition. For example, if the component is an application (e.g., BAS component 102) then data relating to the application or an associated database can be copied from the recovery storage partition. If the component is an OS component then data relating to OS level elements (e.g., device trees, file system, etc.) can be copied from the recovery storage partition and so forth.

At reference numeral 712, the device can load the component from the main storage partition, which now contains the data recovered from the recovery storage partition. Method 700 can proceed to insert A, which is further detailed in connection with FIG. 8, or terminate.

Turning now to FIG. 8, illustrated is a flow diagram 800 of an example, non-limiting computer-implemented method that can provide for additional aspects or elements in connection with automatically recovery from component failure in response to a component restart in accordance with one or more embodiments of the disclosed subject matter. For example, at reference numeral 802, a device (e.g., control device 100) can reformat the main storage partition prior to the copying data from recovery storage partition detailed at reference numeral 710 of FIG. 7.

At reference numeral 804, the device can transmit a request for service of the device. In some embodiments, this request can be transmitted in response to a determination that the recovery counter exceeds a defined recovery threshold. For example, the recovery counter can effectively track the number of times (within a defined period) that the recovery procedure has been attempted previously. If that number exceeds the recovery threshold, then it may be determined that recovery attempts are able to remedy the fault condition, so a service request can be generated.

At reference numeral 806, in response to new hardware being installed, the device can load the new hardware with a configuration stored for faulty hardware that was replaced by the new hardware.

Example Operating Environments

An example embodiment can be a system, a method, and/or a computer program product at any possible technical detail level of integration. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In connection with FIG. 9, the systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which can be explicitly illustrated herein.

Figure 9:
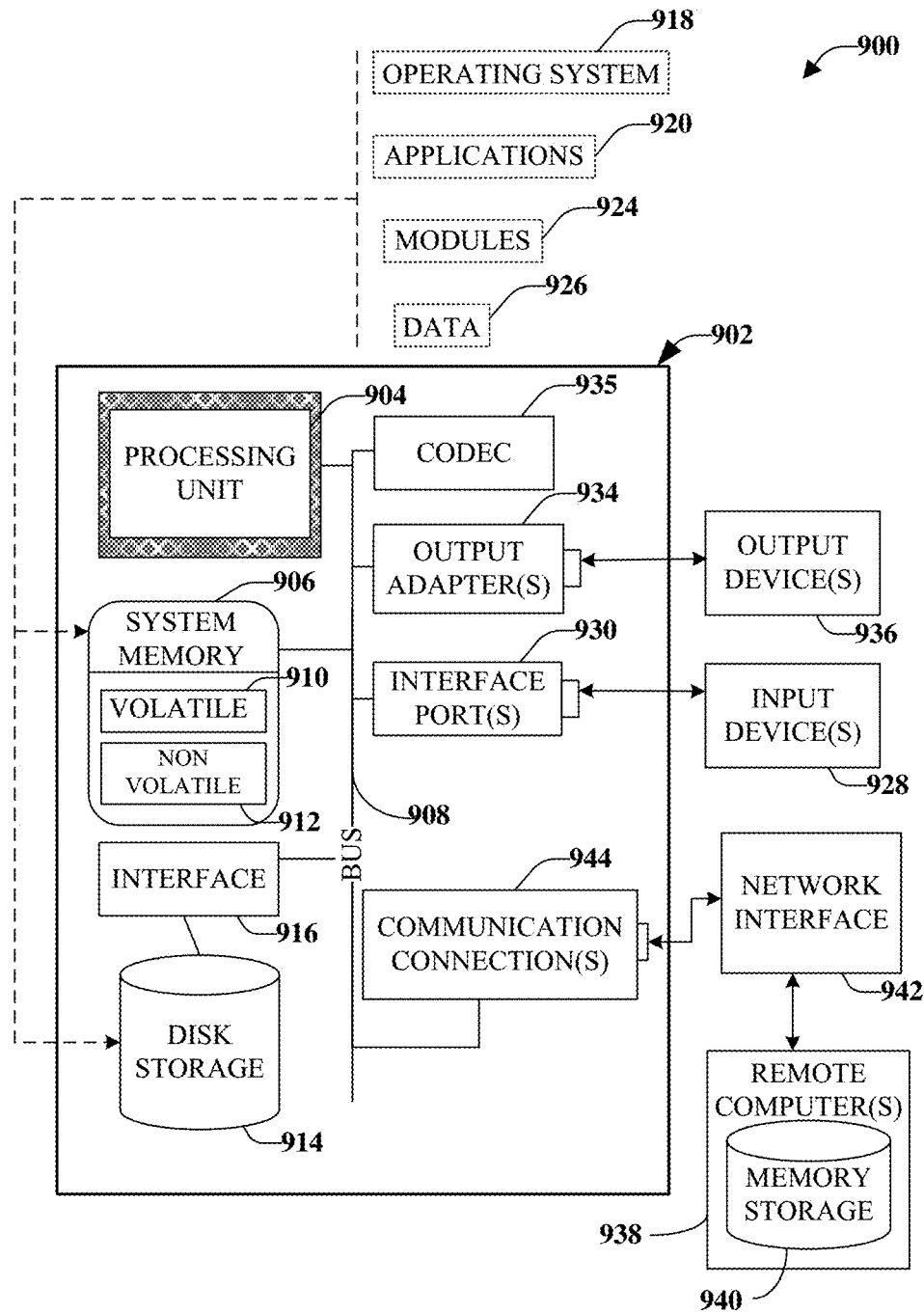
FIG. 9 illustrates a block diagram of an example, non-limiting operating environment in which one or more embodiments described herein can be facilitated.

With reference to FIG. 9, an example environment 900 for implementing various aspects of the claimed subject matter includes a computer 902. The computer 902 includes a processing unit 904, a system memory 906, a codec 935, and a system bus 908. The system bus 908 couples system components including, but not limited to, the system memory 906 to the processing unit 904. The processing unit 904 can be any of various available processors such as an ARM Cortex A7 processor that can be implemented on a Digi ConnectCore 6UL module or the like. Dual microprocessors and other multiprocessor architectures also can be employed as the processing unit 904.

The system bus 908 can be any of several types of bus structure(s) including the memory bus or memory controller, a peripheral bus or external bus, or a local bus using any variety of available bus architectures or protocols including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), Small Computer Systems Interface (SCSI) Serial Peripheral Interface (SPI), inter-integrated circuit (I2C), embedded Multi-Media Controller (eMMC), Universal Synchronous/Asynchronous Receiver/Transmitter (USART), Secure Digital (SD) Double Data Rate Type 3 (DDR3), and Open NAND Flash interface (ONFI).

The system memory 906 includes volatile memory 910 and non-volatile memory 912, which can employ one or more of the disclosed memory architectures, in various embodiments. The basic input/output system (BIOS), containing the basic routines to transfer information between elements within the computer 902, such as during start-up, is stored in non-volatile memory 912. In addition, according to present innovations, codec 935 can include at least one of an encoder or decoder, wherein the at least one of an encoder or decoder can consist of hardware, software, or a combination of hardware and software. Although, codec 935 is depicted as a separate component, codec 935 can be contained within non-volatile memory 912. By way of illustration, and not limitation, non-volatile memory 912 can include read only memory (ROM), programmable ROM (PROM), electrically programmable ROM (EPROM), electrically erasable programmable ROM (EEPROM), Flash memory, 3D Flash memory, or resistive memory such as resistive random-access memory (RRAM). Non-volatile memory 912 can employ one or more of the disclosed memory devices, in at least some embodiments. Moreover, non-volatile memory 912 can be computer memory (e.g., physically integrated with computer 902 or a mainboard thereof), or removable memory. Examples of suitable removable memory with which disclosed embodiments can be implemented can include a secure digital (SD) card, a compact Flash (CF) card, a universal serial bus (USB) memory stick, or the like. Volatile memory 910 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) and so forth.

Computer 902 can also include removable/non-removable, volatile/non-volatile computer storage medium. FIG. 9 illustrates, for example, disk storage 914. Disk storage 914 includes, but is not limited to, devices like a magnetic disk drive, solid state disk (SSD), flash memory card, or memory stick. In addition, disk storage 914 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 914 to the system bus 908, a removable or non-removable interface is typically used, such as interface 916. It is appreciated that storage devices 914 can store information related to a user. Such information might be stored at or provided to a server or to an application running on a user device. In one embodiment, the user can be notified (e.g., by way of output device(s) 936) of the types of information that are stored to disk storage 914 or transmitted to the senzer or application. The user can be provided the opportunity to opt-in or opt-ort Hof having such information collected or shared with the server or application (e.g., by way of input from input device(s) 928).

It is to be appreciated that FIG. 9 describes software that acts as an intermediary between users and the basic computer resources described in the suitable operating environment 900. Such software includes an operating system 918. Operating system 918, which can be stored on disk storage 914, acts to control and allocate resources of the computer system 902. Applications 920 take advantage of the management of resources by operating system 918 through program modules 924, and program data 926, such as the boot/shutdown transaction table and the like, stored either in system memory 906 or on disk storage 914. It is to be appreciated that the claimed subject matter can be implemented with various operating systems or combinations of operating systems.

A user enters commands or information into the computer 902 through input device(s) 928. Input devices 928 include, but are not limited to, a resistive touch pad, capacitive touch pad, a pointing device such as a mouse, trackball, stylus, touch pad, keyboard, microphone, joystick, or game pad; a satellite dish, a scanner, a TV tuner card, a digital camera, a digital video camera, a web camera, and the like. These and other input devices connect to the processing unit 904 through the system bus 908 via interface port(s) 930. Interface port(s) 930 include, for example, a serial port, a parallel port, a game port, and a universal serial bus (USB). Output device(s) 936 use some of the same type of ports as input device(s) 928. Thus, for example, a USB port can be used to provide input to computer 902 and to output information from computer 902 to an output device 936. Output adapter 934 is provided to illustrate that there are some output devices 936 like monitors, speakers, and printers, among other output devices 936, which require special adapters. The output adapters 934 include, by way of illustration and not limitation, video and sound cards that provide a means of connection between the output device 936 and the system bus 908. It should be noted that other devices or systems of devices provide both input and output capabilities such as remote computer(s) 938.

Computer 902 can operate in a networked environment using logical connections to one or more remote computers, such as remote computer(s) 938. The remote computer(s) 938 can be a personal computer, a server, a router, a network PC, a workstation, a microprocessor-based appliance, a peer device, a smart phone, a tablet, or other network node, and typically includes many of the elements described relative to computer 902. For purposes of brevity, only a memory storage device 940 is illustrated with remote computer(s) 938. Remote computer(s) 938 is logically connected to computer 902 through a network interface 942 and then connected via communication connection(s) 944. Network interface 942 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 944 refers to the hardware/software employed to connect the network interface 942 to the bus 908. While communication connection 944 is shown for illustrative clarity inside computer 902, it can also be external to computer 902. The hardware/software necessary for connection to the network interface 942 includes, for exemplary purposes only, internal and external technologies such as, modems including regular telephone grade modems, cable modems and DSL modems, ISDN adapters, and wired and wireless Ethernet cards, hubs, and routers.

While the subject matter has been described above in the general context of computer-executable instructions of a computer program product that runs on a computer or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration and are intended to be non-limiting. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random-access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A control device, comprising:
    a memory that stores computer executable components; and
    a processor that executes computer executable components stored in the memory, wherein the computer executable components comprise:
        a building automation system (BAS) component configured to manage an environment control device;
        an operating system (OS) component configured to manage hardware of the control device and software executed by the control device; and
        a boot loader component that, in response to a restart of the control device, performs a restart procedure comprising:
            in response to determining that the restart occurred due to a fault condition, incrementing a restart counter representing a number of times the control device has been restarted due to the fault condition;
            in response to a first determination that the restart counter does not exceed a defined restart threshold, performing a normal boot procedure comprising loading the OS component from a main storage partition; and
            in response to a second determination that the restart counter exceeds the defined restart threshold, performing a recovery boot procedure comprising loading the OS component from a recovery storage partition that differs from the main storage partition.

2. The control device of claim 1, wherein the restart counter represents the number of times within a defined period of time the control device has been restarted due to the fault condition.

3. The control device of claim 1, wherein the control device further comprises a hardware timer configured to be reset periodically by the OS component, and wherein the boot loader component initializes the hardware timer prior to loading the OS component.

4. The control device of claim 1, wherein the determining that the restart occurred due to the fault condition is in response to a determination that the hardware timer has expired.

5. The control device of claim 1, wherein the fault condition represents a failure of the OS component to load, or a crash or a freeze of the OS component.

6. The control device of claim 1, wherein the restart due to the fault condition excludes a manual restart or restarting in response to a component upgrade or a loss of power.

7. The control device of claim 1, wherein the computer executable components further comprise a supervisory component configured to load the BAS component and to monitor the BAS component in execution.

8. The control device of claim 7, wherein, in response to determining that the BAS component terminates abnormally, performing a BAS restore procedure.

9. The control device of claim 8, wherein the BAS restore procedure comprises:
   incrementing a restore counter representing a count of times within a defined period that the BAS component has terminated abnormally;
   in response to determining that the restore counter exceeds the defined restore threshold, performing a data restore procedure comprising overwriting data in a main storage partition that is used by the BAS component with backed up data from a recovery storage partition that differs from the main storage partition.

10. The control device of claim 8, wherein the determining that the BAS component terminates abnormally is in response to examining an exit code generated when the BAS component terminates.

11. The control device of claim 9, wherein the restart procedure further comprises, in response to a determination that one of the recovery boot procedure or the data restore procedure has been recently performed within a previous time window:
   determining that a current or imminent hardware failure likely exists; and
   transmitting a notification that indicates information relating to the current or imminent hardware failure, a previous or current state of the control device or the environment control device, or a service request for the control device or the environment control device.

12. The control device of claim 1, wherein the recovery storage partition stores data comprising an image of at least one of: the OS component, a kernel of the OS component, a device tree, a file system, the BAS component, or a database of the BAS component.

13. The control device of claim 1, wherein all or a portion of the main storage partition or the recovery storage partition is located in at least one of: a first storage device of the control device, a second storage device that couples to the control device, or a third storage device of a cloud server device that communicatively couples to the control device.

14. A control device, comprising:
   a memory that stores computer executable components; and
   a processor that executes computer executable components stored in the memory, wherein the computer executable components comprise:
      a building automation system (BAS) component configured to manage an environment control device;
      a supervisory component configured to load the BAS component and to monitor the BAS component in execution wherein, in response to a determination that the BAS component has terminated execution, performing a restart procedure comprising:
         in response to determining that the BAS component terminated abnormally, incrementing a restore counter representing a number of times within a defined time period the BAS component terminated abnormally;
         in response to a first determination that the restore counter does not exceed a defined restore threshold, performing a normal load procedure comprising loading the BAS component from a main storage partition; and
         in response to a second determination that the restore counter exceeds the defined restore threshold, performing a recovery procedure comprising copying data from a recovery storage partition to the main storage partition and loading the BAS component from a main storage partition.

15. The control device of claim 14, wherein the determining that the BAS component terminated abnormally is in response to examining an exit code generated when the BAS component terminates.

16. The control device of claim 14, wherein the BAS component or the supervisory component is further configured to perform a backup procedure that stores a copy of data used in operation of the control device to the recovery storage partition.

17. A non-transitory computer-readable storage medium comprising instructions that, in response to execution, cause a device comprising a processor to perform operations, comprising:
   determining that a component of the device has restarted due to a fault condition;
   incrementing a restart counter indicative of a first number of times within a first defined period that the component has been restarted due to the fault condition; and
   in response to a determination that the restart counter exceeds a defined restart threshold, performing a recovery procedure comprising:
      incrementing a recovery counter indicative of a second number of times within a second defined period that the recovery procedure has been performed;
      copying data applicable to the component from a recovery storage partition to a main storage partition; and
      loading the component from the main storage partition.

18. The non-transitory computer-readable storage medium of claim 17, wherein the recovery procedure further comprises reformatting the main storage partition prior to the copying data from recovery storage partition.

19. The non-transitory computer-readable storage medium of claim 17, wherein the operations further comprise in response to determining that the recovery counter exceeds a defined recovery threshold, transmitting a request for service of the device.

20. The non-transitory computer-readable storage medium of claim 19, wherein the operations further comprise in response to new hardware being installed, loading the new hardware with a configuration stored for faulty hardware that was replaced by the new hardware.

* * * * *